US010068411B2

(12) United States Patent
Keller et al.

(10) Patent No.: US 10,068,411 B2
(45) Date of Patent: *Sep. 4, 2018

(54) GEN II METER SYSTEM

(71) Applicant: fybr, Chesterfield, MO (US)

(72) Inventors: Scott Keller, Still River, MA (US);
Tom Swiedler, Roswell, GA (US);
Chirstopher Krstanovic, Windham, NH (US); John R. Goltz, Tuscon, AZ (US); Al Hamilton, Southborough, MA (US); Eric Groft, Somerville, MA (US)

(73) Assignee: FYBR, Harvard, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,523

(22) Filed: Nov. 8, 2016

(65) Prior Publication Data

US 2017/0098339 A1    Apr. 6, 2017

Related U.S. Application Data

(63) Continuation of application No. 12/656,470, filed on Feb. 1, 2010, now Pat. No. 9,489,776.

(Continued)

(51) Int. Cl.
*B60Q 1/48* (2006.01)
*G07F 17/24* (2006.01)
(Continued)

(52) U.S. Cl.
CPC ............. *G07F 17/24* (2013.01); *G07B 15/02* (2013.01); *G08G 1/14* (2013.01)

(58) Field of Classification Search
None
See application file for complete search history.

(56) References Cited

U.S. PATENT DOCUMENTS 4,825,425 A * 4/1989 Turner ................. G07F 17/246
368/7
4,847,776 A * 7/1989 Huang .................... G04F 1/005
340/932.2

(Continued)

FOREIGN PATENT DOCUMENTS

| EP | 2278565 | 1/2011 |
| KR | 20070060373 | 6/2007 |
| WO | 2007027818 | 3/2007 |

OTHER PUBLICATIONS

Rebeling Plastics, "Thermoplastics—Polycarbonate (LEXAN)", accessed Mar. 23, 2015, published on or before Sep. 13, 2007, all pages pertinent, <https://web.archive.org/web/20070913190802/http://www.reblingplastics.com/polycarbonate-lexan.htm>.

(Continued)

*Primary Examiner* — Curtis King
(74) *Attorney, Agent, or Firm* — Perman & Green, LLP

(57) ABSTRACT

Apparatus for controlling and monitoring vehicle parking meter systems, including programmable single space parking meters each having a hardened shell, a vehicle detection sensor for detecting presence of a vehicle, multiple low power microprocessors associated with each parking meter capable of waking up to perform a specialized task, an application processor connected to each of the microprocessors for monitoring and controlling changes in logic for setting the operational parameters and awakening the microprocessors, wherein the microprocessors, the application processor and the vehicle detection sensor are located within the hardened shell, a centralized operational controller accessible to parking personnel capable of monitoring and controlling the parking meters from a remote location, a pass-through radio frequency communication device capable of passing messages from the controller to and from each of the parking meters by way of the internet, and a (Continued)

power supply powering the application processor, microprocessors and vehicle detection sensor.

9 Claims, 2 Drawing Sheets

Related U.S. Application Data

(60) Provisional application No. 61/202,201, filed on Feb. 5, 2009.

(51) Int. Cl.
*G08G 1/14* (2006.01)
*G07B 15/02* (2011.01)

(56) References Cited

U.S. PATENT DOCUMENTS

| | | | |
|---|---|---|---|
| 4,884,059 A | 11/1989 | Shapiro | |
| 5,121,390 A | 6/1992 | Farrell et al. | |
| 5,407,049 A | 4/1995 | Jacobs | |
| 5,721,737 A | 2/1998 | Radjabi et al. | |
| 5,732,812 A * | 3/1998 | Grainger | G07F 17/24 194/217 |
| 5,774,111 A | 6/1998 | Lecland et al. | |
| 5,777,951 A * | 7/1998 | Mitschele | G07F 17/246 368/90 |
| 5,845,268 A * | 12/1998 | Moore | G06Q 30/0284 340/932.2 |
| 5,852,411 A | 12/1998 | Jacobs et al. | |
| 5,910,782 A | 6/1999 | Schmitt et al. | |
| 6,037,880 A | 3/2000 | Manion | |
| 6,055,581 A | 4/2000 | Berglund et al. | |
| 6,111,522 A * | 8/2000 | Hiltz | G06Q 20/363 340/932.2 |
| 6,144,927 A | 11/2000 | Grill et al. | |
| 6,147,624 A | 11/2000 | Clapper | |
| 6,229,455 B1 * | 5/2001 | Yost | G07F 17/24 340/932.2 |
| 6,312,152 B2 * | 11/2001 | Dee | G07F 17/24 194/217 |
| 6,323,785 B1 | 11/2001 | Nickell et al. | |
| 6,340,935 B1 | 1/2002 | Hall | |
| 6,344,806 B1 | 2/2002 | Katz | |
| 6,380,851 B1 * | 4/2002 | Gilbert | G07F 17/24 340/3.1 |
| 6,426,708 B1 | 7/2002 | Trajkovic et al. | |
| 6,477,539 B1 | 11/2002 | Smith | |
| 6,559,776 B2 * | 5/2003 | Katz | G07B 15/02 340/932.2 |
| 6,812,857 B1 * | 11/2004 | Kassab | G07B 15/02 340/539.11 |
| 6,885,311 B2 | 4/2005 | Howard et al. | |
| 6,927,700 B1 | 8/2005 | Quinn | |
| 7,104,447 B1 | 9/2006 | Lopez et al. | |
| 7,230,535 B2 | 6/2007 | Jackson, III et al. | |
| 8,199,001 B2 | 6/2012 | Verbil | |
| 8,301,189 B1 * | 10/2012 | Subramanian | H04W 52/028 455/552.1 |
| 8,306,734 B2 | 11/2012 | Matthews | |
| 8,385,840 B2 | 2/2013 | King | |
| 8,624,756 B2 | 1/2014 | Ganot | |
| 8,671,014 B2 | 3/2014 | Stefik et al. | |
| 8,727,207 B1 * | 5/2014 | Church | G07C 1/30 235/33 |
| 8,749,403 B2 * | 6/2014 | King | G07B 15/02 235/375 |
| 9,000,949 B2 * | 4/2015 | Keller | G07B 15/02 340/4.6 |
| 2002/0030606 A1 * | 3/2002 | Chauvin | G06Q 20/127 340/932.2 |
| 2002/0099976 A1 | 7/2002 | Sanders et al. | |
| 2002/0109609 A1 * | 8/2002 | Potter, Sr. | G07C 1/30 340/932.2 |
| 2002/0111768 A1 | 8/2002 | Ghorayeb et al. | |
| 2002/0120728 A1 | 8/2002 | Braatz et al. | |
| 2002/0162884 A1 * | 11/2002 | Speas | G06K 7/0013 235/380 |
| 2002/0186662 A1 | 12/2002 | Tomassetti et al. | |
| 2003/0080619 A1 * | 5/2003 | Bray | H04L 12/40006 307/10.1 |
| 2003/0102975 A1 * | 6/2003 | Hache | G06Q 30/0284 340/686.6 |
| 2003/0132840 A1 | 7/2003 | Bahar | |
| 2003/0146821 A1 * | 8/2003 | Brandt | G06Q 20/04 340/10.1 |
| 2003/0146852 A1 | 8/2003 | O'Dell | |
| 2003/0169183 A1 * | 9/2003 | Korepanov | G07F 17/246 340/932.2 |
| 2004/0068434 A1 | 4/2004 | Kanekon | |
| 2004/0094619 A1 | 5/2004 | Silberberg | |
| 2004/0146070 A1 | 7/2004 | Blackmore et al. | |
| 2004/0221196 A1 | 11/2004 | Datta et al. | |
| 2004/0252034 A1 | 12/2004 | Slemmer et al. | |
| 2005/0066119 A1 | 3/2005 | Azimi | |
| 2005/0099320 A1 | 5/2005 | Nath et al. | |
| 2005/0104723 A1 | 5/2005 | Mandy | |
| 2005/0155839 A1 | 7/2005 | Banks et al. | |
| 2006/0020487 A1 | 1/2006 | Spittel et al. | |
| 2006/0028919 A1 * | 2/2006 | Mitschele | G04F 1/005 368/90 |
| 2006/0116892 A1 | 6/2006 | Grimes et al. | |
| 2006/0152349 A1 | 7/2006 | Ratnakar | |
| 2006/0203709 A1 | 9/2006 | Laroia et al. | |
| 2006/0270464 A1 * | 11/2006 | Daniels | H04M 1/6066 455/569.1 |
| 2007/0061065 A2 | 3/2007 | Krikelis | |
| 2007/0096943 A1 | 5/2007 | Arnold et al. | |
| 2007/0171069 A1 | 7/2007 | Allen | |
| 2007/0174467 A1 | 7/2007 | Ballou, Jr. et al. | |
| 2007/0210935 A1 * | 9/2007 | Yost | G07B 15/02 340/932.2 |
| 2007/0222581 A1 * | 9/2007 | Hawkins | G06Q 20/127 340/539.1 |
| 2007/0285281 A1 | 12/2007 | Welch | |
| 2007/0293157 A1 | 12/2007 | Haartsen et al. | |
| 2007/0293232 A1 | 12/2007 | Nonaka | |
| 2008/0127325 A1 | 5/2008 | Ebrom et al. | |
| 2008/0165003 A1 | 7/2008 | Graichen et al. | |
| 2008/0165030 A1 | 7/2008 | Kuo et al. | |
| 2008/0231470 A1 | 9/2008 | Ioli | |
| 2008/0235082 A1 | 9/2008 | Zanotti et al. | |
| 2008/0238715 A1 | 10/2008 | Cheng et al. | |
| 2008/0277468 A1 | 11/2008 | Mitschele | |
| 2008/0287070 A1 | 11/2008 | King | |
| 2008/0291054 A1 | 11/2008 | Groft | |
| 2008/0319837 A1 * | 12/2008 | Mitschele | G07B 15/02 705/13 |
| 2009/0086762 A1 | 4/2009 | Kugler | |
| 2009/0109062 A1 | 4/2009 | An | |
| 2009/0132070 A1 | 5/2009 | Ebrom et al. | |
| 2009/0182868 A1 | 7/2009 | McFate et al. | |
| 2009/0183966 A1 * | 7/2009 | King | G06Q 50/30 194/217 |
| 2009/0192950 A1 * | 7/2009 | King | G06Q 30/0284 705/418 |
| 2009/0207003 A1 | 8/2009 | Brekke et al. | |
| 2009/0231129 A1 | 9/2009 | Edwards et al. | |
| 2009/0267732 A1 | 10/2009 | Chauvin et al. | |
| 2010/0026521 A1 | 2/2010 | Noel, II | |
| 2010/0030708 A1 | 2/2010 | Ward, II | |
| 2010/0145811 A1 * | 6/2010 | Burdick | G06Q 20/20 705/17 |
| 2010/0191584 A1 | 7/2010 | Fraser et al. | |
| 2010/0328104 A1 | 12/2010 | Groft | |
| 2011/0062230 A1 | 3/2011 | Ward, II et al. | |
| 2011/0066297 A1 | 3/2011 | Saberi et al. | |
| 2011/0099126 A1 | 4/2011 | Belani et al. | |
| 2011/0102197 A1 | 5/2011 | Herwich | |
| 2011/0111700 A1 | 5/2011 | Hackett | |

(56) References Cited

U.S. PATENT DOCUMENTS

| | | |
|---|---|---|
| 2011/0133958 A1 | 6/2011 | Carboon et al. |
| 2011/0140656 A1 | 6/2011 | Starr et al. |
| 2011/0313822 A1* | 12/2011 | Burdick ................ G06Q 30/02 705/13 |
| 2011/0316716 A1* | 12/2011 | MacKay .............. G04C 11/026 340/870.02 |

OTHER PUBLICATIONS

Wikipedia. "Node (networking)" Wikimedia Foundation, Inc. Feb. 16, 2014. http://en.wikipedia.org/wiki/node_(networking).

\* cited by examiner

GEN II METER SYSTEM

CROSS REFERENCE TO RELATED APPLICATIONS

This is a continuing application of U.S. Non-provisional patent application Ser. No. 12/656,470, filed on Feb. 1, 2010, (now U.S. Pat. No. 9,489,776), which claims the benefit of and the priority from U.S. Provisional Patent Application No. 61/202,201, filed Feb. 5, 2009, the disclosures of which are incorporated herein by reference in their entireties.

BACKGROUND OF THE INVENTION

Field of the Invention

The Gen II Meter System of the invention comprises multiple task specific processors such as an Application Processor, a Meter Controller and a Radio Processor all controlled via shared SPI bus and using rechargeable batteries and solar power sources for and monitoring a vehicle parking meter system.

Related Art

The U.S. patent application Ser. No. 11/802,244 entitled: Parking Systems Employing RAM Techniques, filed 21 May 2007 and assigned to the same assignee, Innovapark, LLC as the present invention.

SUMMARY OF THE INVENTION

The GEN II Meter System of the invention comprises:

A method of powering a parking meter and various peripheral devices thereof such as a radio, vehicle detector and digital rate plate or other low power electronic display using a high energy density-low current battery to charge a rechargeable battery with lesser energy density. Using the above-described system with an additional photovoltaic solar panel to supplement the high energy battery or using the above system without the high energy battery and only the photovoltaic cell. Alternatively, using any of the foregoing above powering methods in conjunction with a non-rechargeable battery or batteries as a backup power source for parking meters or its peripherals.

The problem solved by the GEN II Meter System of the invention is that in prior art systems the power consumption limits the features available at a single space parking meter. Battery power can be used to meet the needs, but requires excessively frequent replacements of the batteries. Longer life (higher energy density) batteries and power sources exist, but have low current or non-linear output than is required by the electronics of the known parking meter system.

In the GEN II Meter System of the invention, by using a combination of one or more of the high energy density batteries with intermittent current as a means to charge higher current/lower density batteries with a "trickle charge" allows long life and higher current for powering remote electronics in parking meters. The electronics require power intermittently with long periods of low-no power consumption which allows the high current batteries to recover their charge during the low power requirement cycles.

In the GEN II Meter System of the invention multiple, interconnected microprocessors are used as a power saving methodology of parking meter systems having a plurality of features.

The problem solved is that power consumption limits the features available at a single space parking meter. Many low power microprocessors exist, but have limited capacity to manage operations.

In the GEN II Meter System using multiple low power microprocessors to perform specialized tasks and only "wake up" for the purpose of performing that specialized task allows for the system overall to consume less power without giving up processing capacity. Power is not wasted keeping processors "awake" when not needed.

The GEN II Meter System uses a specialized network topology for applications of radio transmissions between single space parking meters in traditional high-impact meter housings and a network operations center.

The problem solved by the GEN II Meter System is that single space parking meters rely on battery power to enable operation of the associated electronics. Radio transmissions require relatively high levels of power. Additionally, the thick metal of many hardened single space parking meter housings provide an additional obstacle to radio frequency transmissions. Many existing low-power radio systems rely on short range transmissions and "mesh" topologies to overcome this limitation. While such topology provides the benefit of allowing transmissions to succeed in the context of single space parking meters, it has a number of problems. First, regardless of the redundancy provided by standard mesh topologies, standard paths for data flow are established. These pathways converge for multiple individual parking meters as the data flow approaches the endpoint of a network segment. Network nodes closest to the segment endpoints experience unordinary higher periods of time in active communication with other nodes and consume large amounts of power. Second, mesh networks reach a limitation in the number of nodes that can be supported. While pure "star" topologies can solve this problem, they do not provide an adequate level of redundancy. Lastly the shorter ranges of the radios used in the mesh topologies require a continuous string of radios in order to communicate with remote assets.

The GEN II Meter System uses of a Reed Relay or any other type of circuitry switch as a method of waking a power-saving radio to trigger the download of information from a centralized controller.

The problem solved by the GEN II Meter System is that a meter node radio as described above cannot be manually forced to initiate a communications sessions with the network unless the secure, hardened meter housing is opened.

The GEN II Meter System can use a reed relay switch on a circuit that provides power to an appropriate pin on a microprocessor, the reed relay switch is closed when a magnetic object is within adequate proximity to the switch. The closed circuit allows current to flow to the microprocessor prompting it to initiate a communications session with the upstream collector. Any other form of switch that can likewise be used to physically close the circuit without requiring the meter housing to be opened can be substituted for the reed relay described here.

The GEN II Meter System uses a Radio Frequency Switch as a method of waking a power saving radio to trigger the download of information from a centralized controller.

The problem solved by the GEN II Meter System is that described for the "use of a Reed Relay" as stated previously.

In the GEN II Meter System the problem is solved by the use of an alternate switch as described above except that a passive Radio Frequency sensitive coil is energized by radio waves to close the circuit to power the appropriate pin on the microprocessor. The source of the radio waves can be of any sufficient magnitude of radio waves directed at the meter including, but not limited to, a handheld device, a Radio Frequency wave generator in a collector unit or a passing vehicle.

In the GEN II Meter System of the invention a digital reprogrammable display allows dynamic display of parking policy information at a single space parking meter in a vehicle parking meter system.

In the GEN II Meter System a universal electronic parking meter interface allows a single peripheral device to communicate with any plurality of parking meters including two or more of the following commercially known systems: Duncan Eagle 2000 and 2010, PPM APM, Mackay Guardian or any other parking meter from any other manufacturer.

In the GEN II Meter System a method allows a parking meter to be re-programmed or re-configured for various rates, time limits or hours of operation and other operational parameters including, but not limited to enabling the resetting of time upon a vehicle departure, enabling software that prevents user's ability to add time to the meter beyond the time limit even if payments are received during multiple time frames of the motorists occupancy of the space and granting of free time upon a vehicle's arrival or the enforcement of different rates being charged for an occupant depending on how long they are in the space. Additionally, the Gen II meter system incorporates the ability to display changes in operating policy to users by means of a low power electronic display as previously described affixed in the stead of a traditional meter's rate plate.

A problem of known parking meter systems is that any change in the operating parameters of a single space parking meter requires someone to physically visit each parking meter. In the GEN II Meter System of the invention the provision of a peripheral radio, operational microprocessor and connecting radio network, the peripheral radio communicates such changes to the operational microprocessor. The operational microprocessor, in turn, initiates a change in the logic for all the connected devices to establish the new operating parameters and updates of the displays on both the meter and the low powered electronic display as needed.

The GEN II Meter System of the invention provides a method that allows a merchant to purchase time at a parking meter for a patron by use of a web, cellular or other type of telecommunications medium in which the time purchased may also be posted to the meter monitoring the space in which the patron parked their vehicle.

The problem solved by the GEN II Meter System of the invention is that merchants wishing to attract new customers or improve the experience of potential customers may want to pay for the parking fees of such customers. In some cases, they may want simply to make a change. In either case, either the merchant or the customer must return to the parking meter monitoring the space in which they parked and initiate payments.

In the GEN II Meter System of the invention, by creating a readily available interface for a merchant through either a stand-alone device with a web, telecom or other type of network to a secured command and control interface as described in U.S. patent application, Ser. No. 11/802,244 and entitled; Parking System Employing RAM Parking Techniques, a merchant and/or customer initiates payment from a location more conveniently located to the store. This interface will then initiate a signal to the meter monitoring the space identified as well as enforcement personnel that the space is paid for and, display the time purchased on the display of the parking meter as appropriate.

The GEN II Meter System of the invention provides a method to display time purchased by any remote payment system to an independent parking meter by use of a radio frequency network.

Another problem solved by the GEN II Meter System of the present invention is that payments made using systems disconnected from the parking meter monitoring the space for which payment is being made requires additional and error prone verification by enforcement personnel to avoid writing invalid parking tickets.

This problem is dealt with by the GEN II Meter System of the present invention by connecting the parking meter to a radio network, time can be posted directly to the meter by a centralized command and control interface (CCI). The CCI is similarly connected via any form of networking technology to the payment system including but not limited to telephone payment systems, internet payment systems, stand-alone kiosks and Point-of-Sale systems.

The GEN II Meter System of the invention provides an antenna specifically designed to optimize the communications of a radio to a centralized collector radio from within a hardened, single space meter housing.

The problem solved by the GEN II Meter System of the present invention is that hardened meter housings create unique radio frequency propagation and reflection properties for any radio contained inside.

In the GEN II Meter System a specific design for radios deployed in this manner can maximize the transmission range and minimize power requirements.

The GEN II Meter System of the invention provides a "State Machine" space status logic form to monitor and control a parking space and the various assets installed at that space as well as record a historical data stream reflecting the usage characteristics of the parking space.

The problem solved by the GEN II Meter System of the present invention is that low power microprocessors cannot efficiently perform the complex logic needed to capture and respond to all of the various elements of managing a parking space in a linear manner In the GEN II Meter System of the present invention by, establishing the various elements of the state of a parking meter into various yes/no states and creating a matrix of instructions for the microprocessor to execute for the occurrence of any event in each of the various compilations of those states, the microprocessor can more efficiently react to events. Additionally, chances in the programmatic logic to be used by the microprocessor require updating only the matrix of instructions but not the detailed methods used to perform those instructions.

The Gen II Meter System of the present invention is adaptable to various forms of vehicle detection including, but not limited to induction loop, magnetometer, ultrasonic and/or doppler radar sensors. In all cases, the Gen II Meter system is most reliable when the components are deployed so as to avoid any interference from passing vehicular, pedestrian or other traffic and protected from potential vandalism.

The problem solved by the Gen II Meter System of the present invention is that while inductance loop vehicle detection remains the most reliable form of vehicle detection for monitoring the stationary vehicles in a parking space, installation of inductance loops may be impractical in certain situations. The use of other sensors has often been impractical by interference for movement and events outside of the intended monitoring space of the parking space being monitored. This is due part to the placement of monitoring sensors in "line of sight" of the space. If an object is placed or moves between the sensor and the space being monitored, detection errors can occur. Finally, many other forms of detection have shortcomings in terms of their ability to reliably sense a non-moving vehicle over long periods of time.

The Gen II Meter System of the present invention's preferred embodiment is that of an induction loop placed in the roadbed of the space to be monitored. If the preferred embodiment is not possible, a doppler radar sensor placed either in the roadbed of the space to be monitored and communicating via the wireless radio interface to the Gen II meter system node can be used. Both of these methods ensure that no interference from objects or events outside the space being monitored affect the detection and are able to reliably track the presence of stationary vehicle over the long term. The flexibility inherent in this design also allows for the use of any of the lesser sensor technologies should the preferred embodiments not be possible or feasible.

DETAILED DESCRIPTION

System Overview

The GEN II Meter System of the present invention comprises multiple task specific processors as shown in the Figure. The system is controlled by the Application Processor (AP) and the remaining devices are controlled via a shared SPI bus.

Processor Functions

The AP is a controller for the entire system and its functions include power management and monitoring, managing the state of the parking spaces, and controlling firmware upgrades. The Radio (RP) is essentially a pass-through communications device which passes messages from the AP to the collector and back.

Figure 1:
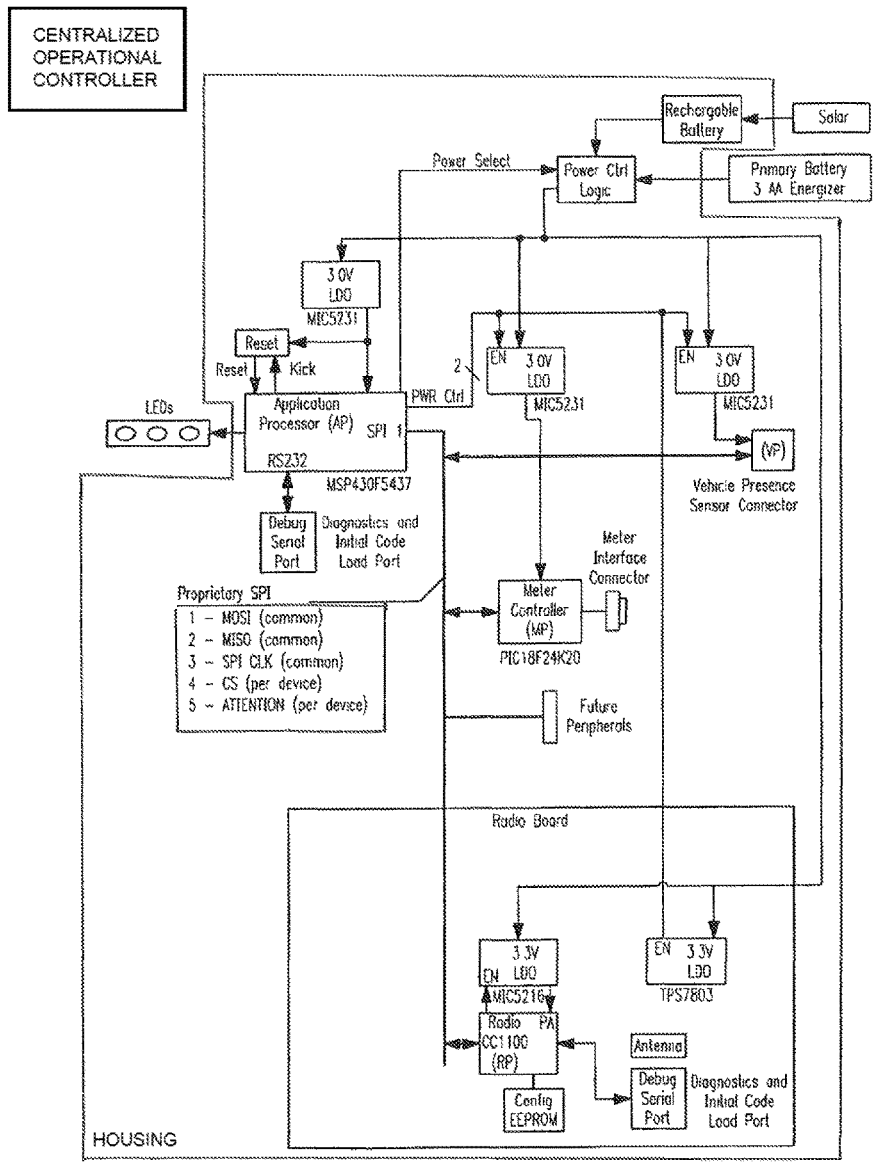
FIG. 1 illustrates the basic features of the GEN II Meter System.
Figure 2:
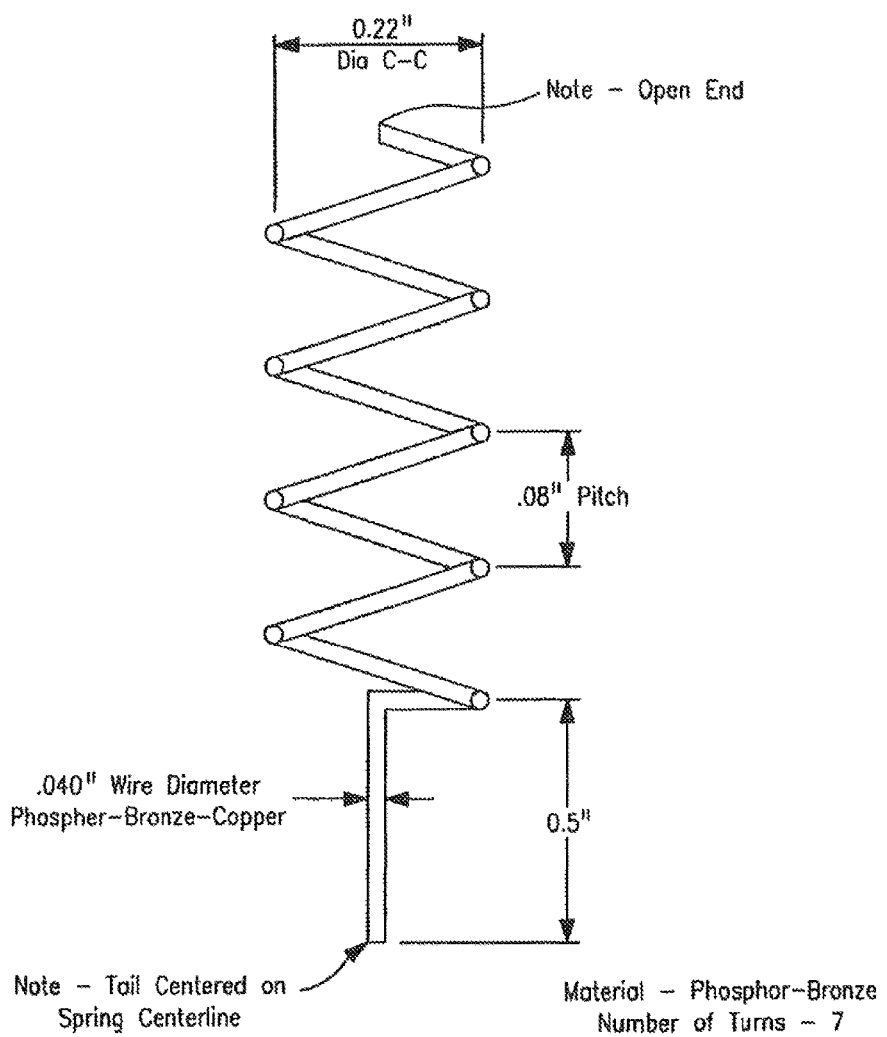
FIG. 2 is an example of an antenna specification tuned for operation in a Model 95 Zinc-Iron housing for use with a 900 MHz radio.

Referring to the FIG. 1, the Meter Processor (MP) handles the communications to/from the parking meter, and the Vehicle Sensor Processor (VP) located on the circuit board provides information to the AP on the status of the vehicle detection sensor. The Vehicle Sensor Processor (VP) may have a Vehicle Presence Sensor Connector that connects the vehicle detection sensor to the Vehicle Sensor Processor (VP). The vehicle Meter Processor (MP), Vehicle Sensor Processor (VP), the Application Processor (AP), the Vehicle Presence Sensor Connector and the Vehicle Detection Sensor may be enclosed completely in a hardened meter housing.

The components of the GEN II Meter System are mounted on a circuit board.

System Power

The system comprises a LiPo rechargeable battery, 3 AA primary cells and a solar panel. The system is powered by the LiPo battery which is recharged by the solar panel. The AA batteries provide backup power if the voltage on the LiPo battery drops due to lack of sunlight in a particular installation location. To enhance power efficiency each processor has its own voltage regulator that can be disabled by the AP to conserve power. The electronics require power intermittently, with long periods of low-no power consumption, which allows the high current batteries to recover their charge during low power requirement cycles. In the GEN II Meter System using multiple low power microprocessors to perform specialized asks and only "wake-up" for the purpose for performing that specialized task allows for the system overall to consume less power without giving up processing capacity. Power is not wasted keeping processors "awake" when not needed. The microprocessors are interconnected to effect power saving. The Application Processor (AP) controls the entire system and its function include power management and monitoring. Hence, as shown in FIG. 1 and as noted before, the SPI Bus connecting the application processor (AP) to the system microprocessors and other devices may include a circuitry switch (CS) associated for device. As previously described, the circuitry switch (CS) may comprise a magnetic reed relay radio frequency or physical connection switch, that is configured to temporarily disconnect the power supply and initiate a re-start of processes on the microprocessors enabling running of pre-scripted commands and/or enabling a listening mode to receive the operating parameters without the need to open the single space parking meter housing.

PCB Configuration

To allow maximum flexibility and the use of either 900 MHz or 2.4 GHz, the radio is designed as a daughter board mounted to the main system circuit board. The main sensor circuit board also attaches as a module to the main system board.

Mechanical Configuration

The entire PCB assembly, including the rechargeable battery, is designed to be permanently potted into an injection molded housing. The solar panel and AA battery holder are attached to the outside of the housing. Both a pigtail sensor cable and meter interface cable exit the housing for connection to the sensor loop and meter, respectively.

Power Control

To prevent the sealed rechargeable battery from being drained prior to installation, the system monitors the presence of the AA batteries. If no external batteries are installed the system remains powered down. Additionally, removal of the external batteries causes the system to power down after a set time period.

Tables 3a-3d—Examples of Stored Programming Event Handler Matrices

As noted before, a set of logical rules are employed on the central operational controller, on the Application Processor or the low power microprocessors to determine an operational status of a vehicle space and allow for an adherence of an occupant of a vehicle space being monitored to a parking policy. This collection of tables is actually an example of a single set of programming event handler matrix. The matrix provided below is a exemplary representation of the specialized tasks that comprise monitoring and communicating regarding a vehicle space occupancy, a single space parking meter's payment status, communication to upstream data transmissions and any other specialized requirement of the single space parking meters to assure reliable operation. This matrix shows along the left hand side the parking state the monitored space is in at the time the observed event is registered by various components designed into the Gen II system. The programming on the Application Processor (AP) then cross references both the event and the state currently registered for the space for an instruction set to enact various messaging to other components of the Gen II system and/or to initiate communications to be passed up to the centralized operational control system. This command set is a representation of one such set of instructions that could be compiled for the operation of a Gen II System. Additional states, Events, and instruction sets could be added or changed to alter the operation of the system as policies change or new event types are defined.

What is claimed is:

1. Apparatus for controlling and monitoring vehicle parking meter systems, comprising:
    a plurality of programmable single space parking meters each having a hardened shell;
    a vehicle detection sensor configured to detect presence of a vehicle in a vehicle space;
    multiple low power microprocessors associated with each of the plurality of programmable single space parking meters capable of waking up to perform a specialized task, wherein the vehicle detection sensor is connected to at least one of the multiple low power microprocessors;
    an application processor connected to each of the multiple low power microprocessors capable of monitoring and controlling changes in logic for setting the operational parameters and awakening the multiple low power microprocessors, wherein the multiple low power microprocessors, the application processor and the vehicle detection sensor are located within the hardened shell;
    a centralized operational controller accessible to parking personnel capable of monitoring and controlling the plurality of programmable single space parking meters from a remote location;
    a pass-through radio frequency communication device capable of passing messages from the centralized operational controller to and from each of the plurality of programmable single space parking meters by way of the internet; and
    a power supply powering the application processor, the low power microprocessors and the vehicle detection sensor and comprising a rechargeable battery.

2. Apparatus for controlling and monitoring vehicle parking meter systems according to claim 1, further comprising a circuitry switch comprising a magnetic reed relay, radio frequency or physical connection switch configured to temporarily disconnect the power supply and initiate a re-start of processes on the microprocessors enabling running of pre-scripted commands and/or enabling a listening mode to receive the operating parameters.

3. Apparatus for controlling and monitoring vehicle parking meter systems according to claim 1, wherein said pass-through communication device operates at either 900 MHz or 2.4 GHz and implements a combination of star and mesh network topologies.

4. Apparatus for controlling and monitoring vehicle parking meter systems according to claim 1, further comprising a solar panel mounted onto the power supply, wherein the rechargeable battery is a high energy density-low current battery and removal of one or more of the high energy density-low current battery and the solar panel mounted onto the power supply causes each of the plurality of programmable single space parking meters to power down after a set time period.

5. Apparatus for controlling and monitoring vehicle parking meter systems according to claim 1, wherein the pass-through radio frequency communication device communicates the operational parameters to the application processor whereby changes in logic for the parking meters are effected.

6. Apparatus for controlling and monitoring vehicle parking meter systems according to claim 1, wherein a set of logical rules are employed on the centralized operational controller, on the application processor or the low power microprocessors to determine an operational status of a vehicle space and allow for an adherence of an occupant of a vehicle space being monitored to a parking policy.

7. Apparatus for controlling and monitoring vehicle parking meter systems according to claim 1, the vehicle detection sensor configured to detect presence of a vehicle using a vehicle detection methodology that comprises at least one of an induction, magnetic anomaly, sonar, RADAR, weight detection, or vibrational detection sensor to monitor a vehicle space occupancy status.

8. Apparatus for controlling and monitoring vehicle parking meter systems according to claim 1, wherein the specialized task comprises monitoring and communicating regarding a vehicle space occupancy, a single space parking meter's payment status and any other specialized requirements of the multiple low power microprocessors associated with each of the plurality of programmable single space parking meters to assure reliable operation.

9. Apparatus for controlling and monitoring vehicle parking meter systems according to claim 1, wherein the hardened shell, with the vehicle detection sensor disposed therein, is placed in a roadbed of the vehicle space being monitored.

* * * * *